Jan. 9, 1940.   C. W. DIECKMANN   2,186,716
CUTTER FOR MEAT GRINDERS
Filed Sept. 11, 1937
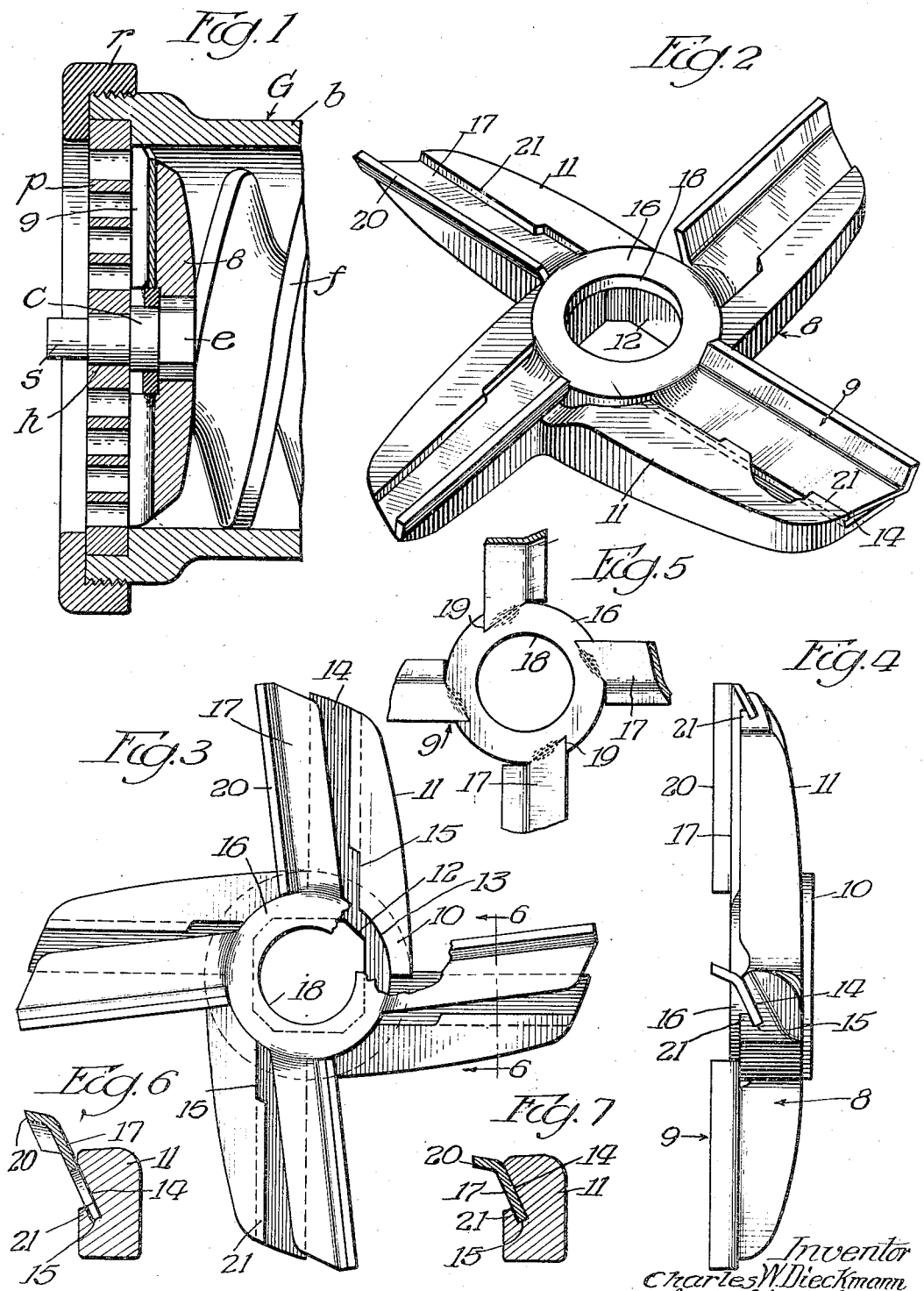

Patented Jan. 9, 1940

2,186,716

UNITED STATES PATENT OFFICE 2,186,716

CUTTER FOR MEAT GRINDERS

Charles W. Dieckmann, Chicago, Ill.

Application September 11, 1937, Serial No. 163,349

2 Claims. (Cl. 146—189)

The present invention relates generally to cutters for meat grinders. More particularly the invention relates to that type of meat grinder cutter which is adapted to fit against the inner face of a circular perforated plate at the discharge end of the casing of the grinder and to be driven conjointly with a feed screw by a centrally disposed shaft in the casing and comprises (1) a cast metal spider consisting of a hub and a plurality of substantially radially extending arms; and (2) a knife against the rear face of, and connected for drive by, the spider and consisting of a hub with a shaft receiving hole therein and a plurality of blades which extend substantially radially from the hub and in lapped relation with the arms of the spider and have the front or leading margins thereof bent rearwardly and ground to form knife edges for cutting the meat as it is fed by the screw against the perforated plate.

One object of the invention is to provide a cutter of this type in which the arms of the spider are grooved longitudinally to receive the rear or trailing margins of the blades of the knife and also form shoulders which engage the rear edges of the blades throughout the entire length thereof and form effective driving connections between the spider arms and the knife.

Another object of the invention is to provide a meat grinder cutter of the last mentioned character in which the knife is adapted to be connected to the spider by rotating it relatively to the spider in order to bring the rear or trailing margins thereof into place in the grooves in the spider arms and the spider has integral lips which overhang and are positioned outwardly of the outer portions of the grooves and are adapted releasably and frictionally to hold said trailing margins of the blades within the grooves after such margins have been inserted or moved into the grooves as the result of relative rotation of the knife and spider in connection with the assembly of the cutter.

A still further object of the invention is to provide a meat grinder cutter which not only is an improvement upon, and is more efficient, practical and sanitary than, previously designed cutters of the same general character but is also so designed and constructed that it may be manufactured at a low and reasonable cost.

Other objects of the invention and the various advantages and characteristics of the present meat grinder cutter will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical longitudinal sectional view of the discharge end of a meat grinder having applied thereto a cutter embodying the invention;

Figure 2 is a perspective of the improved cutter showing the knife and spider in connected or assembled relation;

Figure 3 is a rear elevational view showing the knife in position to be rotated into interlocked or connected relation with the arms of the spider;

Figure 4 is a side view of the cutter;

Figure 5 is a fragmentary front view of the knife illustrating in detail the manner in which the blades are connected to the knife hub;

Figure 6 is a transverse sectional view taken on the line 6—6 of Figure 3 and illustrating the position of the rear or trailing margins of the knife blade prior to rotation of the knife into connected relation with the spider; and Figure 7 is a detail sectional view showing the manner in which the lips serve releasably and frictionally to hold the trailing margins of the knife blades in the grooves in the arms of the spider.

The cutter which is shown in the drawing constitutes the preferred embodiment of the invention and comprises as the parts or elements thereof a spider 8 and a knife 9 and is adapted for use in connection with a meat grinder G. The latter is of conventional or standard design and comprises a horizontally extending tubular body $b$ and a feed screw $f$. The body $b$ embodies at the inlet end thereof a hopper (not shown) and has a perforated plate $p$ at its discharge end. The plate, as shown in Figure 1, fits within an annular groove in the discharge end of the body and is secured in place by means of a clamp ring $r$. The feed screw extends longitudinally through the body $b$ and is adapted during drive or rotation thereof to feed the meat to be ground from the hopper to and through the perforated plate $p$. It corresponds in diameter to the internal diameter of the body and is supported at its discharge end by means of a shaft $s$ which extends through a bearing forming hole $h$ in the central portion of the perforated plate and has on the portion thereof between the plate and the discharge end of the screw a polygonal enlargement e, and an enlarged cylindrical part c. The cutter is disposed between the discharge end of the feed screw and the perforated plate and is adapted for conjoint drive with the screw and to cut or grind the meat as the latter is fed by the screw to and through the plate p.

The spider 8 is formed of a one piece metallic casting and consists of a hub 10 and a plurality of arms 11. The hub 10 has a polygonal hole 12 which extends through the central portion thereof and corresponds in shape to the polygonal enlargement e on the shaft s and is adapted to receive said enlargement, as shown in Figure 1, and form a driving connection between the shaft and the spider. In addition to the polygonal hole 12 the hub 10 of the spider has a circular seat 13. This seat is formed in the rear face of the hub 10 and is larger in size than the hole. The arms 11 of the spider are preferably four in number and extend substantially radially from the hub 10. They are arranged at right angles to one another and have longitudinally extending grooves 14 in the rear faces thereof. These grooves extend from what may be termed the leading edges of the arms to the central portions of the arms and run or extend from the outer extremities of the arms to the circular seat 13. The faces of the spider arms which define the bottom portions of the grooves are flat and extend at an angle of approximately 25° with respect to the plane of the rear face of the hub 10. The faces of the arms which define the inner side portions of the grooves extend at right angles to the faces which define the groove bottom portions, and form or constitute longitudinally extending shoulders 15. The latter extend from the outer extremities of the arms to the seat 13. The front faces of the arms 11 of the spider are curved or rounded so that the meat is readily deflected to the sides of the arms when the cutter is in use in the grinder G.

The knife 9 is designed and adapted to fit against the rear face of the spider 11 of the cutter and consists of a hub 16 and a plurality of blades 17. The hub is ring-shaped and has a hole 18 in the central portion thereof. This hole corresponds in diameter to, and is adapted to receive, the enlarged cylindrical part c of the shaft s, as shown in Figure 1. The hub 16 is shaped to fit within the circular seat 13 in the hub 10 of the spider and coacts with said seat to hold the knife against side or edgewise displacement with respect to the spider when it is in its operative position, that is, in connected or assembled relation with the spider. The blades 17 correspond in number to the arms 11 and are formed separately from the hub 16. They extend substantially radially from the hub, as shown in Figure 3, and are arranged at right angles to one another. The inner ends of the blades are pointed, as shown in Figure 5 and fit within and are welded to V-shaped cut-outs 19 in the outer margin of the hub 16. The blades 17 are formed of steel or like hard metal and are cut in such manner that the grain of the metal extends longitudinally thereof. The rear or trailing margins of the blades are adapted to fit flatly within the grooves 14 in the arms 11 of the spider and are flat on both faces thereof as shown in Figures 6 and 7. They are shaped conformably to the grooves 14 and are disposed at an angle of approximately 25° with respect to the plane of the rear face of the ring shaped hub 16. The rear edges of the trailing margins of the blades 17 are straight and are adapted to fit flatly against the shoulders 15 when the knife is in its operative position with respect to the spider. The shoulders 15 are the same in length as the rear edges of the trailing margins of the blades 17 and hence driving pressure is applied to the blades throughout the entire length thereof and there is little if any strain on the junctures of the blades and the hub 16 during operation of the cutter. The front or leading margins of the blades are bent rearwardly and are ground at the front portions thereof to form cutting edges 20. The latter are adapted during operation of the cutter to revolve around the inner face of the perforated plate p and effect grinding or cutting of the meat as the latter is forced against the plate by the feed screw f.

In order releasably and securely to hold the knife in connected or assembled relation with the spider the arms 11 are provided with integral longitudinally extending lips 21. These lips overhang the outer rear portions of the grooves 14, as shown in Figures 4, 6 and 7 and are adapted frictionally to grip the outer portions of the rear or trailing margins of the blades 17. The inner faces of the lips 21 are spaced from the walls of the spider arms 11 which define the bottom portions of the grooves 14 a distance substantially corresponding to the thickness of the blades with the result that the trailing margins of the blades are frictionally gripped when the knife is in place with the rear edges of the blades in abutting relation with the shoulders 15. The lips extend inwards from the outer ends of the arms 11 of the spider and terminate adjacent to the central portions of said arm. In assembling the cutter, that is, in connecting the knife to the spider, the knife is first arranged so that the ring-shaped hub 16 thereof is in centered relation with the circular seat 13 in the hub of the spider and the blades 17 are opposite the grooves 14 in the arms 11 and in spaced relation with the lips 21, as shown in Figure 3. Thereafter the blades are pressed towards the spider arms 11 and the knife is rotated relatively to the spider in order to bring the rear or trailing margins of the blades into seated relation with the grooves and abutment with the shoulders 15. The blades are urged or pressed inwards in order to bring the trailing margins thereof beneath the lips 21. Because of the arrangement and design of the lips the knife moves into its operative position with a snap action and is frictionally and effectively held in place by the lips as soon as the trailing edges come into abutment with the shoulders 15. In order to remove the knife for cleaning or repair purposes it is only necessary to rotate it relatively to the spider to a point where the trailing margins of the blades clear the lips 21 and then shift the knife axially away from the spider.

The herein described cutter may be manufactured at a low and reasonable cost due to the fact that it consists of but two parts and does not embody hooks or attaching screws for securing the knife to the spider. By reason of the fact that the lips 21 are employed releasably and frictionally to hold the knife in place the knife is correctly held in place in its operative position and may be readily removed from the spider for washing purposes. Due to the fact that the blades 17 of the knife are formed separately from the ring 16 and with the grain transversely thereof they are capable of effectively fulfilling their purpose without undue wear or likelihood of breakage.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A cutter for a meat grinder, comprising a spider consisting of a hub with mounting means therefor, and a plurality of arms extending substantially radially from the hub and embodying in their rear faces longitudinal grooves extending inwardly from the leading edges of the arms to the central portions of said arms and from the outer extremities of the arms to the hub and having flat bottom faces extending at an acute angle with respect to the plane of the rear face of the hub and also having straight full length shoulders along their rear portions, a detachable unitary knife consisting of a hub fitting against said rear face of the spider hub and a plurality of blades connected to and extending substantially radially from said knife hub and having the leading margins thereof shaped to present cutting edges and their trailing margins extending angularly with respect to the knife hub and fitting flatly in the grooves and against said shoulders, and sole means for releasably securing the knife in assembled relation with the spider comprising elongated lips connected to the spider arms and positioned along and in overhanging relation with the outer portions of the shoulders and so as to engage directly and frictionally the rear faces of the trailing margins of the blades, said knife being attachable to the spider by placing the hub thereof against said rear face of the spider hub and the blades in substantially lapped relation with the spider arms and then pressing the blades towards the spider arms and at the same time rotating the knife relatively to the spider so as to cause the trailing margins of the blades to snap under the lips into proper seated relation with said grooves and lips.

2. A cutter for a meat grinder, comprising a spider consisting of a hub having a polygonal hole therethrough for mounting purposes and a circular seat around said hole and in its rear face and a plurality of arms extending substantially radially from the hub and embodying in their rear faces longitudinal grooves extending inwardly from the leading edges of the arms to the central portions of said arms and from the outer extremities of the arms to the seat and having flat bottom faces extending at an acute angle with respect to the plane of the rear face of the hub and also having straight full length shoulders along their rear portions, a detachable knife consisting of a ring-shaped hub fitting in the circular seat in said rear face of the spider hub and a plurality of blades connected to and extending substantially radially from the ring-shaped hub and having the leading margins thereof shaped to present cutting edges and their trailing margins extending angularly with respect to the knife hub and fitting flatly in the grooves and against said shoulders, and means for releasably securing the knife in assembled relation with the spider comprising elongated lips formed integrally with the spider arms and positioned along and in overhanging relation with the outer portions of the shoulders and so as to engage directly and frictionally the rear faces of the trailing margins of the blades.

CHARLES W. DIECKMANN.